United States Patent
Wangler

[19]

[11] Patent Number: 5,870,180
[45] Date of Patent: Feb. 9, 1999

[54] TIME MEASUREMENT DEVICE AND METHOD USEFUL IN A LASER RANGE CAMERA

[76] Inventor: Richard J. Wangler, 2450 Derbyshire Rd., Maitland, Fla. 32751

[21] Appl. No.: 958,032

[22] Filed: Oct. 27, 1997

Related U.S. Application Data

[63] Continuation of Ser. No. 422,755, Apr. 14, 1995, Pat. No. 5,682,229.

[51] Int. Cl.$^6$ .............................. G01C 3/08; G04F 37/00; G04C 17/00
[52] U.S. Cl. ..................... 356/401; 356/5.05; 356/5.06; 368/89; 368/239; 396/171; 396/172
[58] Field of Search ................................. 356/5.05, 5.06, 356/4.01; 368/239, 89; 396/171, 172

[56] References Cited

U.S. PATENT DOCUMENTS

| | | |
|---|---|---|
| 3,440,938 | 4/1969 | Stimson et al. . |
| 3,789,653 | 2/1974 | Brejaud . |
| 4,155,029 | 5/1979 | Yamaoka . |
| 4,895,440 | 1/1990 | Cain et al. . |

*Primary Examiner*—Stephen C. Buczinski
*Attorney, Agent, or Firm*—Allen, Dyer, Doppelt, Milbrath & Gilchrist, P.A.

[57] ABSTRACT

A time measurement device useful with laser range cameras and time-of-flight measuring methods includes a light transmitter responsive to start and stop signals for transmitting the light during a time interval to be measured, and a light receiver for receiving the light and for providing an output signal related to an exposure of the light during the time interval time between start and stop signals to the transmitter The output signal thus providing a measurement of the time between the start and the stop signals. The transmitter includes a light emitting diode to which an electrical current is provided for generating a constant output light source for the transmitter. The light receiver includes charged coupled devices (CCD) having a linear response to an amount of exposure to the light received from the light transmitter. As a result, the CCD provides the output signal in a linear relationship to the amount of exposure to the light, and thus a measurement of the time interval.

17 Claims, 7 Drawing Sheets

FIG. 1a
(PRIOR ART)
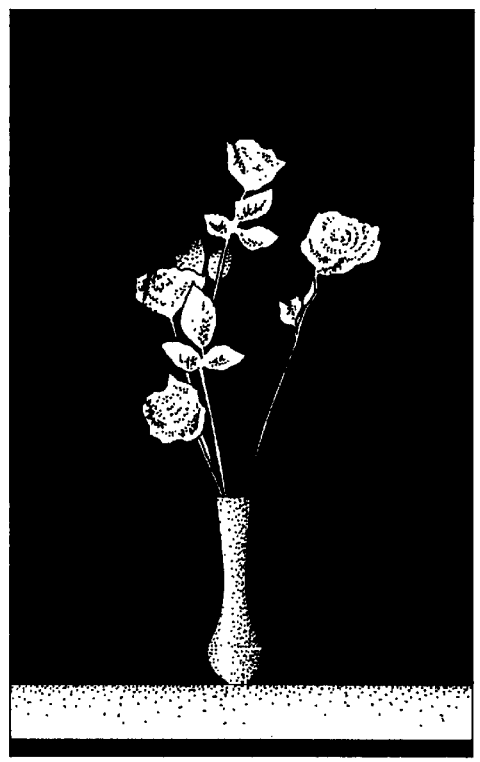
FIG. 1b
(PRIOR ART)
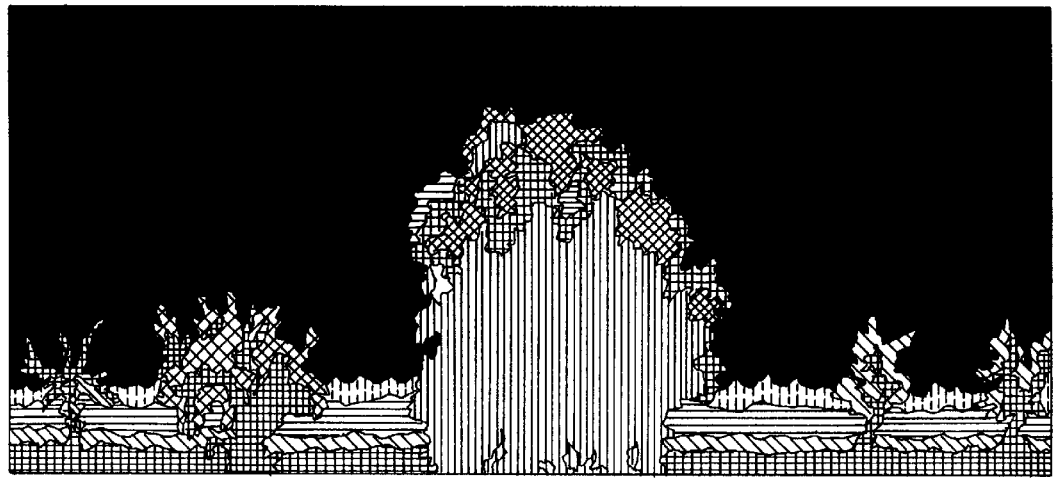
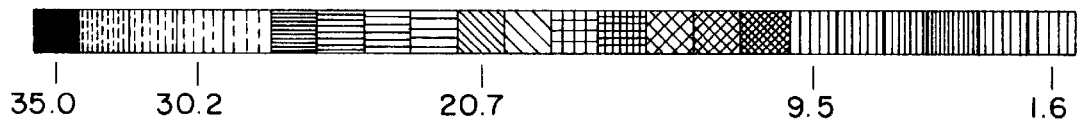
| | | | | |
|---|---|---|---|---|
| 35.0 | 30.2 | 20.7 | 9.5 | 1.6 |
FIG. 2
(PRIOR ART)

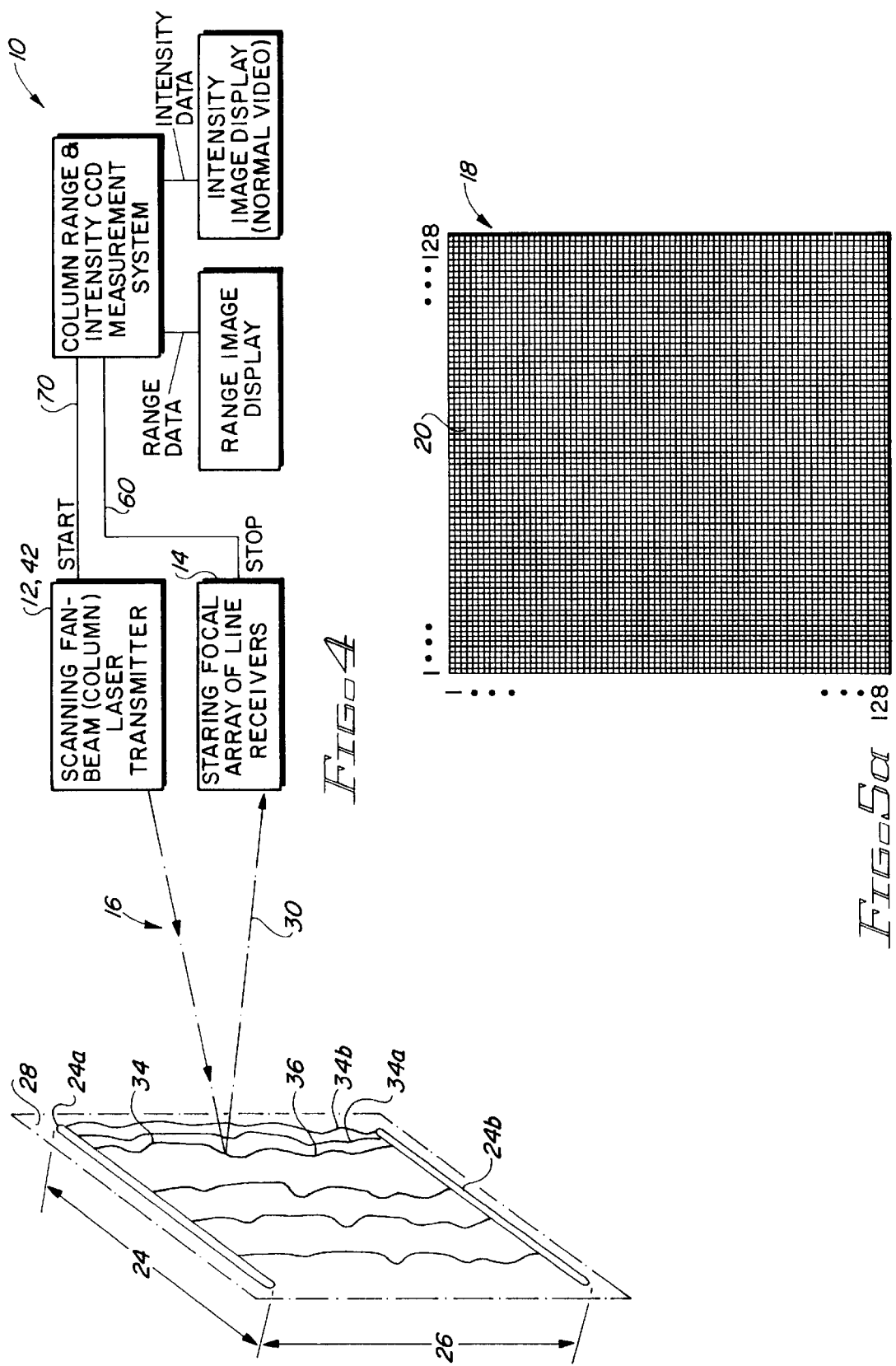

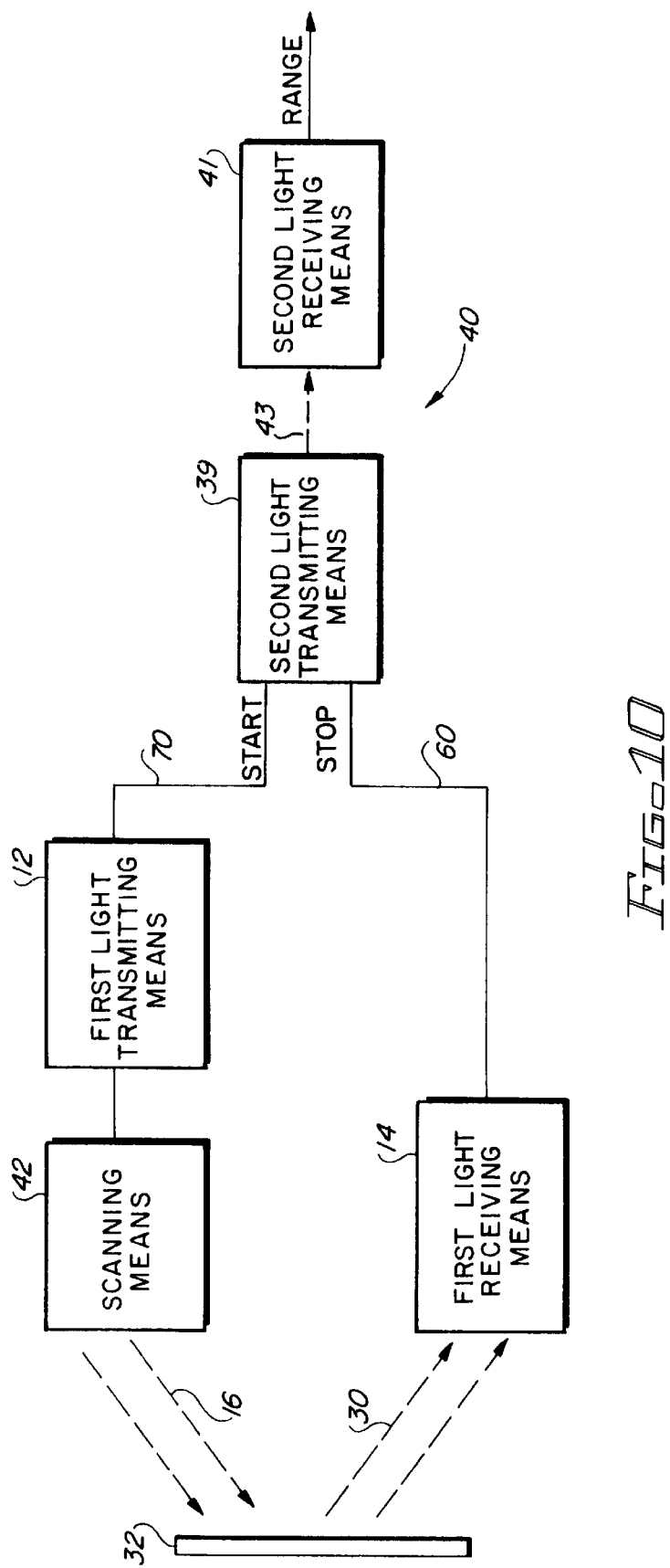

TIME MEASUREMENT DEVICE AND METHOD USEFUL IN A LASER RANGE CAMERA

This is a continuation of application Ser. No. 08/422,755 filed Apr. 14, 1995, for Laser Range Camera, issuing as U.S. Pat. No. 5,682,229 on Oct. 28, 1997, commonly owned with the present invention.

FIELD OF THE INVENTION

The laser range camera of the present invention provides the imaging quality of a video camera with a capability for measuring distance from the imaging device camera to each pixel in a scene. This laser range imaging camera is useful in producing an image of a scene having little to no contrast in the scene when the scene has texture or range variations.

BACKGROUND OF THE INVENTION

Laser radar (LADAR) is a rapidly evolving photonic technology with significance for both military and commercial users. Laser radar is still in its infancy with considerable R&D resources being directed at the technology. LADAR commands this interest due to the significant performance benefits it offers such as greater spatial and range resolution when compared to conventional radar and sonar. The extension of LADAR technology to provide imaging in addition to range information rather than an either/or situation has opened a host of new applications. Imaging laser radars have already found applications in both government defense and commercial business areas. There are several companies that offer commercial products that use range imaging for a variety of applications. These products will be briefly discussed since they demonstrate the usefulness of range imaging systems and simultaneously show the limitations of existing range imaging systems.

The first product to be discussed is LASAR from Perceptron Corp. in Farmington Hills, Mich. the LASAR camera dramatically expands the potential of machine vision by providing both a 3-D range image and the normal 2-D intensity image of surfaces, objects and scenes. An example of its capability is illustrated with reference to FIGS. 1a and 1b, which were taken from Perceptron's LASAR product brochure. The vase of flowers is barely discernible in the 2-D intensity image of FIG. 1a; but in the 3-D image of FIG. 1b, the vase of flowers is clearly visible. The 3-D information is displayed on 2-D displays by a variety of techniques. One technique is to display the range of each pixel as a color, and the result is called a "false color" image illustrated in FIG. 2. Another is to only display pixels that have range values between a minimum and maximum "gate" while all others are displayed black. This "range gate" method is used to produce the display shown in FIG. 3. The LASAR camera is a time-of-flight, CW (tone), amplitude modulated laser radar, which is sequentially raster-scanned over the scene within the camera's field-of-view (FOV), making a range measurement at each pixel location. The typical time to produce an image like the one shown in FIG. 1b is three to seven seconds. This product requires an accurate two-axis scanning (beam-steering) system. Since the LASAR is intended for robotic vision in factory automation applications that are typically short-ranged situations, the optical components are small, and two-axis scanning is much less of a problem as compared to long-range applications where larger optical components would be required;. The larger optical components would have greater inertia and force the two-axis scanning system to be larger and slower, making frame times even longer. The round trip time of the laser light, from the laser to the target and back to the receiver, is not a factor for the LASAR application; but in longer range applications, it could be the limiting factor in the frame rate.

The next range imaging product to be discussed is produced by Schwartz Electro-Optics, Inc. (SEO), and is called Treesense, and has been described in U.S. Pat. No. 5,275,423 to Wangler, et al. Treesense is a sensor used in the agricultural industry for controlling the spray pattern of large spray machines. The Treesense is a pulsed, time-of-flight range measuring system which has separate transmit and receive apertures that are continuously scanned in a vertical plane by a rotating mirror. This vertical scan plane is perpendicular to the axis of the forward motion of the spray vehicle. The position of the mirror, and correspondingly the laser beam, is determined by a shaft encoder attached to the motor driving the mirror. The sensor detects the presence and profiles of trees within a 90° sector on each side of the spray vehicle. The presence or absence of foliage in the various angular zones is used to control the spray nozzles for each of the appropriate zones. This type of arrangement is identical to the military "push-broom" sensors. A "false color" image from the Treesense is shown in FIG. 2 (note that the axis in the direction of the tree row is obtained by a "distancetraveled" sensor mounted on a wheel of the spray vehicle). In the false color image, range is represented by the various colors. The laser in the Treesense is pulsed at 90 kHz when the mirror rotates at 40 rev/sec. Each revolution produces one scan on the left side of the spray vehicle and one scan on the right side. The Treesense is a special type of range camera that has only a one-axis scanner and uses the vehicle's forward motion to obtain the second axis of the frame.

The two Laser Radar Imaging systems cited above are special situations that, by their particular application, minimize many of the problems of more general laser radar imaging systems which will be described with reference to FIG. 3. The normal video (TV) system stares at the scene and receives all the energy backscattered from the scene that is in the receiver's FOV. The video system is fairly simple in that the receiver can be a small Charge Coupled Device (CCD) array and the system is passive. This means that the source of illumination is the solar background illumination, so there is no need for a laser transmitter. The CCD array comprises many photodiodes in a two-dimensional array that is located in the focal plane of the camera's lens, such that each of the elements in the array has a small FOV (beamlet), and the sum of all element FOVs makes up the overall camera FOV. The video system gives excellent x-axis and y-axis resolution, but there is no z-axis resolution since the CCD element integrates all the power coming from the scene that is contained within that element's beamlet. The power in the element FOV is integrated over a time which starts just after the element is read on one frame until the time it is read on the next frame. The major problems with normal TV systems are that they do not work in complete darkness and they have no resolution in the z-axis. Night-time operation requirements led to related technology areas, which are low light video ($L^2V$) or Image Intensified video ($I^2V$) and Forward Looking Infra Red (FLIR) systems. The $I^2V$ systems are the night vision devices used by government facilities around the world. Night goggles and night vision sights are also used by civil law enforcement agencies of many countries. The use of FLIR systems is much more limited due to high cost and technical sophistication. The $I^2V$ system is essentially a CCD camera with a photon amplifier situated in the focal plane of the camera's lens which maps the scene from the focal plane to the CCD. Night vision devices normally cannot work in daylight because the brighter scene illumination is many orders of magnitude greater than the illumination at night and this high input level causes damage to the image intensifier.

The FLIR system senses "black body" radiation coming from the scene. Every object at a temperature above 0°K., or −273° C., emits black body radiation. This black body radiation is electromagnetic radiation, the same as normal light, laser, radio or microwave radiation, and all are governed by the same physical laws. A difference between a normal video system and a FLIR system is the wavelength region at which its detector is sensitive. When considering spectral irradiance from an object at temperatures between 0° C. and 100° C., it is observed that the power at $\lambda=10\,\mu m$ is approximately three orders of magnitude greater than at $\lambda=2\,\mu m$. This is a reason why most FLIR systems operate in the wavelength region around 10 $\mu m$. This causes a major problem in the detector area since the energy of a photon at 10 $\mu m$ is only 0.124 a electron volts. The photo detectors used in the visual region of the spectrum are normally semiconductors. Silicon is used in the CCD devices. Silicon has an energy gap of 1.106 electron volts between the valence band electrons and the conduction band electrons in the material. A photon entering a silicon detector imparts its energy to an electron and causes the electron to move from the valence band to the conduction band. The energy of a photon is related to its wavelength by $e_p=1.24/\lambda(\mu)$ in electron volts. The exchange of energy between a valence band electron is an all-or-nothing exchange and is not cumulative. The energy gaps for germanium and silicon semiconductors are 0.67 and 1.106 electron volts respectively. Silicon photo detectors have a peak response at $\lambda=0.8\,\mu m$, and at 1.04 $\mu m$ the quantum efficiency (ration of photons to electrons produced) is ⅓ that for $\lambda=0.8$, even though the photon energy is greater than the energy gap. This means that a 10 $\mu m$ detector must have material with very low energy gaps between the valence and conduction bands. There are materials that meet this requirement, but the energy of thermally excited electrons also have this much energy. This means that 10 $\mu m$ detectors need to be cryogenically cooled. Due to many problems, initially there were no 2-D array detectors in FLIR systems. The FLIR systems either used a single element that was serially raster scanned over the entire FOV or linear arrays of detectors that were scanned in one axis. Many FLIR systems were generally made from common standardized modules. The common module receiver was a linear array of 120 elements in which each element had its own energy receiver. Therefore, a FLIR system that had 400 horizontal and 240 vertical pixels required two common FLIR receiver modules (120 pixels each) which were scanned horizontally thirty times a second in order to be compatible with normal TV monitors.

The common module FLIR system requires one axis of scanning, although there has been much effort to develop staring focal plan array FLIR systems. The advantages of the staring focal plane FLIR system are that no scanning would be required and the energy would be larger since the black body power radiated toward the FLIR could be integrated for the entire frame period rather than the frame period times. $(n_h)^{-1}$, where $n_h$ is the number of pixels in a horizontal line.

There is a misconception that if one had an n×n photodetector that an n×n Laser Range Imaging system would be just a minor design problem. There are major differences between a passive 2-D imaging system and an active 3-D laser range imaging system. It is true that a 2-D focal plane detector is required, but such detectors have been available for some time. In fact, one such detector was featured on the cover of the March 1988 issue of *Laser & Photronics Magazine* by Gordon Publications, Inc., Dover, N.J. 07801-0952. This was a 464 element, silicon photodiode made by Centronics, Inc. There have been multi-element 1-D and 2-D APD arrays made by at least two vendors (Advanced Photonics, Inc. and EG&G). Advanced Photonics, Inc. (API) and SEO have worked closely on other programs, and API will produce a developmental APD array for this Project.

Again with reference to FIG. 3, if a CCD Camera was used in place of the Laser Radar, the number of pixels in X (azimuth) and Y (elevation) axis would typically be in the range of 200 to 500. The pixel element of CCD Array Camera would receive all optical energy scattered by an object which is anywhere within pixel FOV along X axis and Y axis, and at any range from zero to infinity. Thus, the CCD camera gives very good angular resolution but does not have any range or distance resolution. By using two CCD cameras with collinear optical axes and a known baseline separation, the range of an object can be determined from range and angle data as recorded by the two cameras. By doing this for all distinguishable features common to both camera's field-of-views (FOV) a 3-D image could be produced. This system has the advantage of being passive (no scene illumination is required) if the scene is visible to the human eye. However, if the scene was completely uniform there would be no contrast points to compute range from the angle change as viewed by the two cameras. An example of this would be rolling hills covered with a wheat crop. When there are plenty of contrast points, the process of determining surfaces are computationally intensive. Another disadvantage is that the system needs scene illumination. In daylight conditions this is not a problem, but if night operation is required this is a problem.

Active systems for measuring range have been in existence for many years. These range measuring devices utilize nearly all regions of the electromagnetic spectrum from low frequency radio waves to light wave lengths approaching x-rays. Range measuring systems have also used other technologies other than electro-magnetic devices (laser and microwaves), an example of this is the ultrasonic range measuring used in the medical field (sonograms).

The subject of the present invention is a range imaging system obtained by an active optical system. A scene will intersect the imaged/ranged space at various pixels contained in the total solid FOV of the range imaging system. The coordinates where the scene intersects the pixels is the measurement that the imaging radar must make. There are several different approaches currently used to produced a range imaging system, i.e., which satisfy requirements of measuring the X (azimuth), Y (elevation) and Z (range) of each pixel of scene intercept within the sensor FOV. One approach used is to sequentially raster scan a range finder whose transmit beam and receiver FOV are the same size as the desired pixel resolution. Such a system would require scanning the transmitter beam and receive FOV in two axes. Such a system would start in the upper left corner of the imaged/ranged space shown in FIG. 3. At this location the laser transmitter would transmit a signal toward the scene and the receiver would measure the range and intensity of the reflected return signal. After completing the measurements, the device is then pointed at the next pixel to the right and the measurement process is repeated, etc. After making measurements of all pixels in the top row of pixels, the steering mechanism then points the range finder to the first pixel in the second row and measurements are made for each pixel in that row. This process continues until the entire imaged/ranged space of FIG. 3 is covered. In order to have the range images do what is comparable to normal video camera images, the number of pixels must at least 128 X-pixels by 128 Y-pixels or a total of $128^2$ (16,384) pixels. This sequential raster scanning system requires a 2-axis scanning device which is required to point the laser range finder to 16,384 different positions for each frame. This type of range imaging is only suitable for short range systems, Long range systems require a large receive aperture in order to collect enough reflected signal to make the range measurement. Also, it is generally the practice to have the receiver FOV the same size as the laser beam in order to minimize the background noise. However this further complicates the scanning process. When scanning the point in the scene that the laser transmitter will illuminate is determined at time of transmission and the required direction lag of the receiver FOV to receive the reflected signal from this point is determined by the round trip light propagation time. In other words, if the transmit beam and the receive FOV were the same size, the scanning system would be have to be step raster scanned. Even ignoring, the scanning problem (assuming no time required to scan from one position to the next position), the number of frames per second is limited simply due to the round trip light propagation time. For example, a scene at 2 kilometers would have $13.3 \times 10^{-6}$ round trip propagation time so that a 128 by 128 sequential scan system would take $16,384 \times 13.3 \times 10^{-6}$ or 0.22 sec to do a complete scan without allowing any time for making measurements. So it seems that even without time allotted for scanning, data measuring, or data processing time, a 2 km sequentially scanned system would be limited to 4.5 frames per second which is a factor of 10 less than a normal video system. The major disadvantage of a 2 km sequential raster scan is that 2-axis scanning is limited to low frame rate and requires step scanning of an enlarged receiver FOV.

Another type of active range imaging system has a laser transmitter and gated image intensifier CCD Array as a receiver. The receiver is a normal video camera with a photo multiplying micro-channel plate in front of the CCD array camera detector. Here the only signal of interest is the reflected laser energy. A narrow band width optical filter, whose band pass center wavelength is the wavelength of the laser, is placed in front of the receiver aperture or in an optical path between aperture and micro-channel plate photo multiplier. The purpose of the filter is to eliminate as much as possible all light coming from the scene except the reflected laser energy. Unfortunately, the solar energy has energy in the spectral region beginning in the UV and extending to wavelengths beyond the far infra red spectra region. This peak energy region is in the visual region (400 to 700 nm wavelengths). These physical laws and physical constraints establish how spectrally pure the laser can be and how narrow the optical bandpass filter can be in a practical system. Consider the restrictions a practical system might utilize with a 1 nm wide optical band pass filter when a solid state laser (such as Nd:YAG, Nd:YVO$_4$ or Nd:YLF) is used as the laser transmitter. It is reasonable to use a 10 Angstrom or 0.1 nm bandpass filter. This type system uses a gated micro channel plate image intensifier for both the gain it provides for the small amount of energy passing through the narrow bandpass filter and also to shutter the receiver in order to determine range. The range determination operates by firing the laser and at a precise time later, opening the shutter (gate the micro channel plate (MCP) on). If the scene surface is within the FOV at range R=$T_1$C/2 (where $T_1$=time interval and C=speed of light) there will be reflected laser from those pixels. The MCP gating needs to be narrow in order to prevent pixels at greater range to be present also. The range resolution of the system is the time convolution of the gating and the laser pulse wave form. Referring back to FIG. 3, this system looks at all X and Y pixels at once but only one Z axis pixel. The gating or shuttering signal range gates laser reflected energy, but does not range gate background reflected energy i.e, it time gates or time limits the acceptance of the solar background reflected energy. A simple example will illustrate the importance of the statement. A small aircraft occupies one-half the cross section area (x,y) of one pixel at some range R/C and the rest of the FOV is filled with bright white cloud background. All the CCD pixels will have the same energy recorded for gating times except the pixel containing the aircraft. That pixel will have the same output for all Z gate times except the gate time corresponding to the range of the aircraft. The energy for this gate time is the sum of solar background reflected from the bright white cloud behind the aircraft (½) pixel during the gate time and aircraft reflected solar background plus the laser reflected energy from the aircraft. This example shows the gate time limits the solar background but does not limit receiving background from objects located at ranges corresponding to the gating time.

In the CCD camera the received laser energy during the range gate time must be greater than the received background energy in the adjacent pixels by a factor of 2 in order that the pixels with target can be distinguished from the pixels without target. In the range finder case, the instantaneous light intensity must be detected so that range can be measured. In order to detect the laser pulse, the reflected laser pulse must produce a signal that is at least four times greater than the root mean squared "shot" noise caused by the background solar light. Therefore, for a range finder silicon detector, the receive power must produce a signal current which is four times the rms noise current. When comparing the required power for the gated CCD and the range finder detector, the CCD minimum detectable power is 100,000 times greater than that of the range finder detector. This assumes that the dominate noise in both systems is the background which may not be the case. Typically, each system must be analyzed on an individual basis. Well-designed range finders have been made which have had minimum detectable signal in the 5 to 10 photons region which is significantly less than that required for a shuttered CCD system.

The sequentially range gated CCD receiver-laser flood light illuminated scene system has the advantage of no scanning required. However, it has the disadvantage of low sensitivity in high background, many range cells to search for the scene if short gate times are used for good range resolution, a very-high power laser is required since the laser energy is spread over the entire scene and finally poor efficiency of the laser power since the shutter only receives scene pixels which are at ranges which corresponds to the shutter time.

SUMMARY OF THE INVENTION

An object of the invention is to provide a camera delivering imaging as well as range information for furnishing exact size information of an object within its field of view. Such a camera must be useful for night viewing. Further, it is an object of the invention to provide such a camera having a high speed beam scanning while minimizing the amount of electrical and mechanical devices typically required for such cameras. It is yet another object of the invention to avoid the problems of typical laser radar devices that rely on mechanical scanning techniques needing to overcome inertia and high costs associated therewith. It is further an object of the invention to provide a camera that requires scanning in only one axis. Yet another object is to provide a device for providing time of flight information to determine range that minimizes typical electronic demands while simplifying the amount and cost of components by using existing state of the art electronic components. It is further an object of the invention to provide measurement and processing that does not add to frame time in a long range system thereby adding to the efficiency and expanse of use for the camera.

A range camera of the present invention comprises means for transmitting a fan shaped energy beam for illuminating an energy column onto a scene for energy reflection from the scene, means for scanning the energy column across the scene, means for receiving a portion of the energy reflected from the scene, the receiving means responsive to the reflected energy for developing an electrical signal indicative of intensity of the received reflection, the electrical signal further providing information for determining a range to the scene, means for converting the electrical signal to optical signals indicative of the intensity and range, the converting means responsive to the electrical signal and transmission triggering input for providing digital signals representative of intensity and range, and means for processing the digital signals for providing range and intensity data, the processing means providing a triggering signal to the transmitting means for initiating transmission of the energy beam, the triggering signal further provided to the converting means for determining range.

In the preferred embodiment, the receiving means comprises an optical receiver array forming a focal plane for receiving elements within the array to define a matrix of rows and columns, optical fibers having one end positioned within the matrix for receiving reflected light from the scene, the fibers arranged into element sets, each set defining a line across a field of view of the receiver, the line orthogonal to the scanned beam, and an optical device communicating with each fiber set, the optical device converting a received optical signal to electrical signals representative of a location within the field of view and an intensity of the reflected beam for the location.

Further, in a preferred embodiment of the invention, means for measuring a time of flight of the energy from the transmitting means to the receiving means, comprises a CCD having an electrical output proportional to optical energy exposure of the CCD. The exposure is initiated by a triggering of the transmission means and terminated by the electrical signal representative of the time a portion of reflected energy is received from the receiving means. The CCD provides an output voltage signal representative of a range from a location at the scene.

BRIEF DESCRIPTION OF DRAWINGS

A preferred embodiment of the invention as well as alternate embodiments are described by way of example with reference to the accompanying drawings in which:

FIG. 1a is a two dimensional (2-D) intensity mapped image from a prior art LASAR camera;

FIG. 1b is a ranged mapped three-dimensional (3-D) image using a range gated display of a prior art LASAR camera;

FIG. 2 is a false color range image display from a prior art laser scanning pulsed time-of-flight range measuring system;

FIG. 4 is a functional block diagram of the laser range camera of the present invention;

FIGS. 5a and 5b illustrate a 128×128 element focal plane array of one embodiment of the present invention;

FIG. 10 is a functional block diagram illustrating a range-measuring function of a preferred embodiment of the present invention.

DETAILED DESCRIPTION

Figure 3:
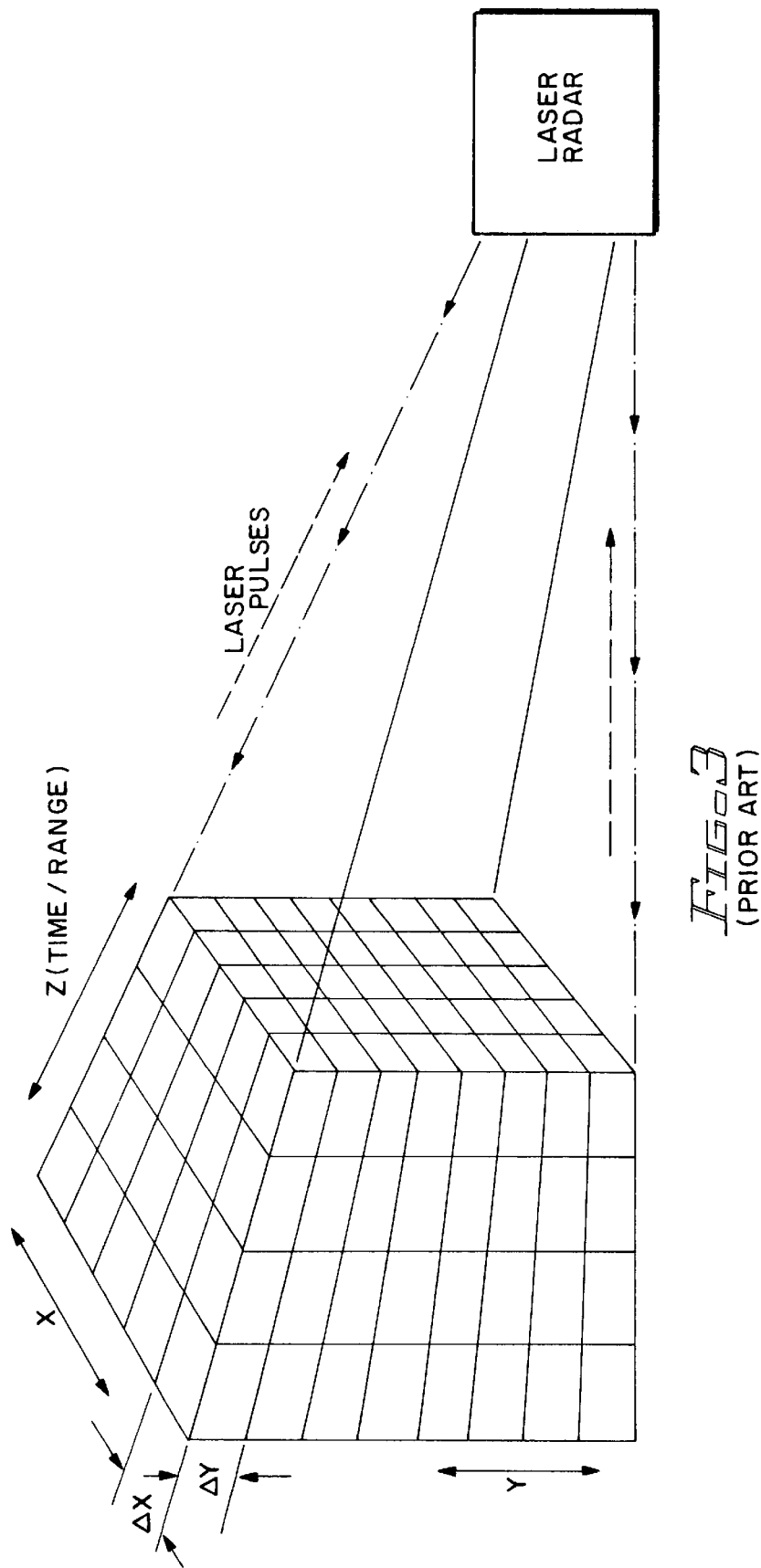
FIG. 3 illustrates spatial relationship of a camera and coordinates of a scene imaged ranged space, and gating concept.

The laser range camera 10 as illustrated with reference to FIG. 4 is an active system having a laser transmitter 12 as a first light transmitting means and a laser receiver 14 as a first light receiving means. The laser transmitter 12 has a beam 16 that is fan-shaped and forms a column-shaped beam out in the field. By way of example, and with reference to FIGS. 5a and 5b, in one embodiment of the present invention, the receiver 14 comprises 128 line receivers 18. Each of the line receivers 18 have 128 optical fibers 20 arranged in a linear array 22, as illustrated with reference to FIGS. 6a and 6b and as will be discussed later. Again with reference to FIG. 4, each linear array 22 has a field of view 24, as illustrated for top 24a and bottom 24b fields of view for each line receiver 18.

Figure 5B:
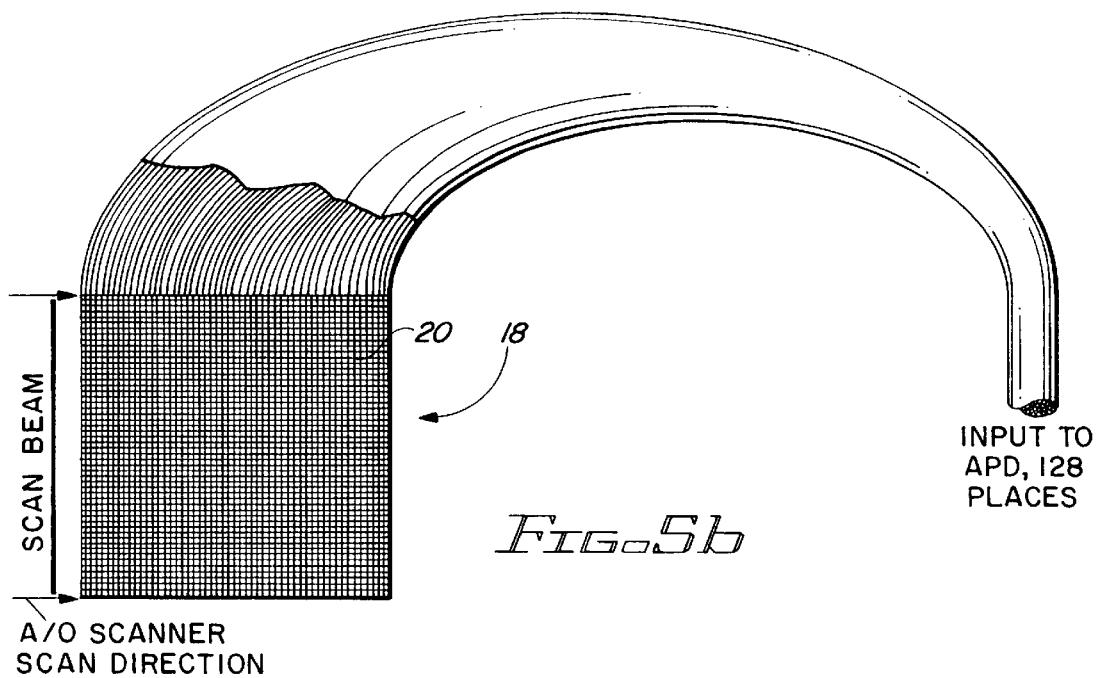
Figure 6A:
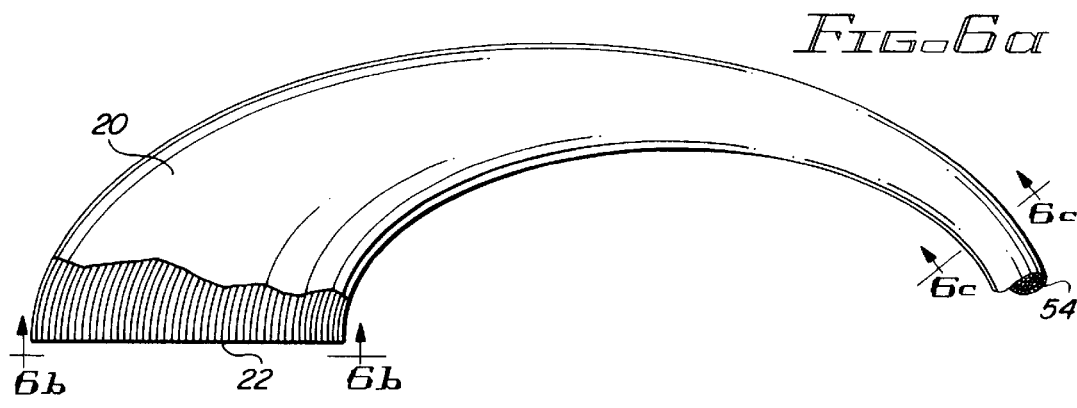
FIGS. 6a, 6b, and 6c are perspective and end views respectively illustrating multiple optical fibers in a linear array at one end and bundled at the other end for communicating with an avalanche photo diode.
Figure 6B:
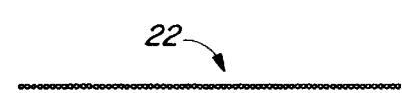
Figure 6C:
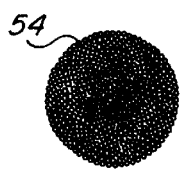

The laser camera 10 is not limited to a receiver 14 having only 128×128 fiber matrix field of view 18, as illustrated by way of example in FIGS. 5a and 5b. Multiple line receivers extending beyond 128 are anticipated. In addition, the linear array 22, as is illustrated with reference to FIGS. 6a–6c, can be a solid or ribbon-styled fiber. Discrete fibers are practical as of this writing, but it is anticipated that alternate fiber media will be used. The laser range camera 10 is not limited to this number of line receivers 18 and is used just for sake of discussion.

At the beginning of each frame of the laser range camera 10, the laser transmitter 12 starts on the left-hand side 26 and is scanned using scanning means, as will be described later to the right-hand side 28. The beam 16 of the laser transmitter 12 covers all the individual fields of view 24 using the line receivers 18, all 128, in the example herein described. When the laser transmitter 12 fires in position 1, all 128 receivers 18 will receive signals at the time it takes to propagate from the laser transmitter 12 back to the receiver 14. Reflected energy or return beam is identified as numeral 30 in FIG. 4. A receive signal will occur at different times on different receivers because not all image points will be at the same range.

By scanning the column-shaped beam 16 across a scene 32 (illustrated with a dotted line in FIG. 4), reflected energy or the return beam 30 provides information to the receiver 14 for each designated position across the scene 32.

By way of example, again with reference to FIG. 4, an illuminated column 34 on the scene literally reflects a beam that contains varying arrival times representative of the scene contours 36.

The time of arrival at the receiver 14 of the reflected beam 30 will be measured from the time of transmission of the beam 16 from the laser transmitter 12 to the time it returns and is received by the receiver 14. Further, the receive signal pulse amplitude will not be the same for all receivers 18 because some pixels or elements of the scene 32 being viewed will have a higher reflectivity and therefore reflect a stronger signal than the lower reflectivity pixels. The range of each pixel and the intensity or amplitude of each pixel, is measured by a CCD range and intensity measurement system 40 comprising second light transmitting means 39 and second light receiving means 41 which communicates with the receiver 14, as illustrated with reference to FIG. 7. The range system 40 receives electrical signals 60 from each of the line receivers 18 as further described later with reference to FIG. 7. The range data from the range and intensity measurement system 40 is displayed on a range display. The intensity data from the measurement system 40 will be displayed on an intensity image display. The intensity data is similar to that of a video camera, where the amplitude or intensity of the signal is a function of the target reflectivity of the solar illumination. In the present invention, the intensity provides a measure of the reflected energy of the laser reflected beam 30. This is comparable to a monochromatic, single wave length video camera. The range and intensity of the measurement system 40 will be described in detail later After measurements have been made for one position, for example, illuminated scene column 34, the column beam 16 of the transmitter 12 is moved to the second position 34a. At the second position 34a, the range and intensity is measured for each pixel and then is moved to the third position 34b, and so forth until the entire length of the line receivers 18 has been covered by 128 motions of scanning means comprising the beam deflector 42 cooperating with the transmitter 12.

Figure 8:
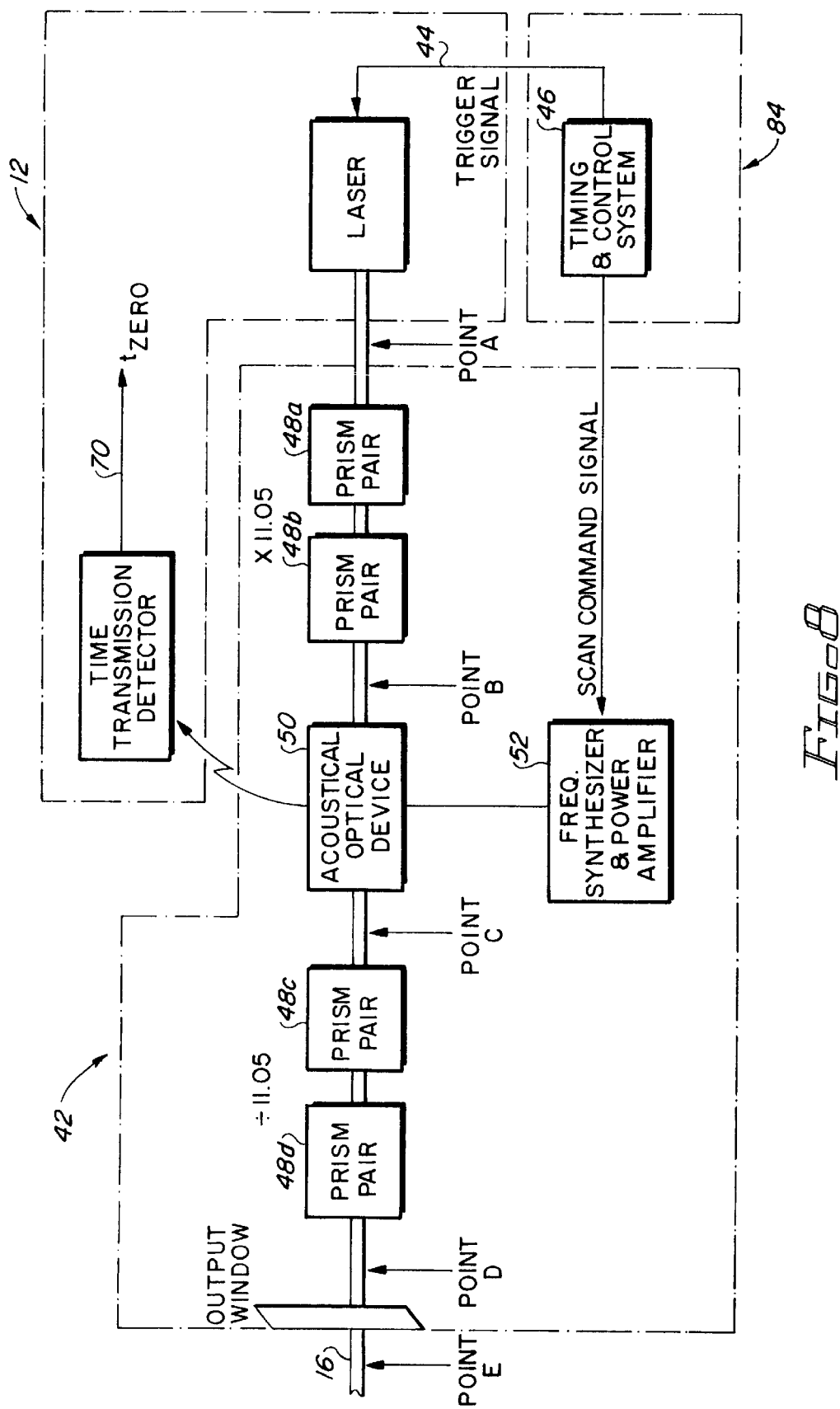
FIG. 8 is a functional block diagram of a transmitter optical system of the present invention.

The transmit beam 16 is scanned by an A/O (acousto-optical) device 50 of scanning means, a beam deflector 42, as illustrated with reference to FIG. 8. This device 42 has the advantage in that it is electronically controlled, is non-mechanical, has no inertia to overcome, and can move a beam rapidly under tightly controlled conditions.

The laser transmitter 12 is triggered by the trigger signal 44 from the timing and control circuitry 46. The laser beam 16 output is circular (at Point A). Optical devices 48 are used to modify a symmetrical beam divergence into an asymmetrical beam divergence for a fan-shaped beam (at Point E, at the scene). The optical devices 48 used to do this beam shaping in the present invention are prism pairs (PP). In a preferred embodiment of the present invention, there are four prism pairs 48a–48d, as illustrated in FIG. 8. The first two 48a, 48b expand the horizontal axis of the laser beam 16, thus reducing the beam divergence (asymmetrical collimation) in the horizontal direction by a same expansion factor. After expanding the horizontal dimension of the laser beam 16, it passes through the A/O beam deflector 50. The direction of the laser beam from the A/O device 50 is a function of the RF frequency that is driving the A/O device 50 from the frequency synthesizer 52. The frequency synthesizer 52 and power amplifier shown in block diagrams of FIG. 8 provide the direction or scanning of the laser beam 16. After the A/O device 50, the beam 16 goes through another two prism pairs 48c, 48d which reduces the vertical dimension of the beam 16, thus increasing the divergence by the same factor. The resulting laser beam 16 (Point E, at the scene) in the far field is the very long narrow column transmit beam 34, as illustrated with reference to FIG. 4. The direction in which this fan beam 16 is pointed is controlled by the frequency synthesizer 52 driving the A/O beam deflector 50.

The focal plane of the receive optics in the laser range camera 10 provides an image of what exists in the far field pattern of the receive optical system. The long narrow field of view of a single receiver shown in FIG. 4 has the shape of a linear array of fiber optics which is in the focal plane of the received optical system. The optical fibers 20 are transmitted from the linear array 22 at one end to a circular output 54, as illustrated with reference to FIGS. 6a–6c. This circular end 54 is coupled to an avalanche photo diode 55 which has a circular area that matches the end 54 of the bundle of fibers 20. In one embodiment of the present invention, the total fiber array includes 128 of the line-to-circle converters 54 of the fibers 20. The result, as illustrated with reference to FIG. 5, is a square array of fiber receivers 18 which has 128×128 individual fibers 20 bundled into groups of 128. All the fibers in one group are from the same row (1 through 128), so the 128×128 fibers are terminated into 128 line receivers 18. The receivers 18 further comprise avalanche photo diodes (APD) 55 and amplifiers to amplify the received signals up to a sufficient level to be measured by a threshold detector 58 and to have sufficient amplitude to drive an intensity circuit in the range and intensity measurement section of the system. Again, with reference to FIG. 7, the output 60 from each of the receivers is an input to the range and intensity measuring circuit 40. The APD output, and thus the receiver output, 60 is an electrical signal which is a measure of the received laser energy.

Figure 7:
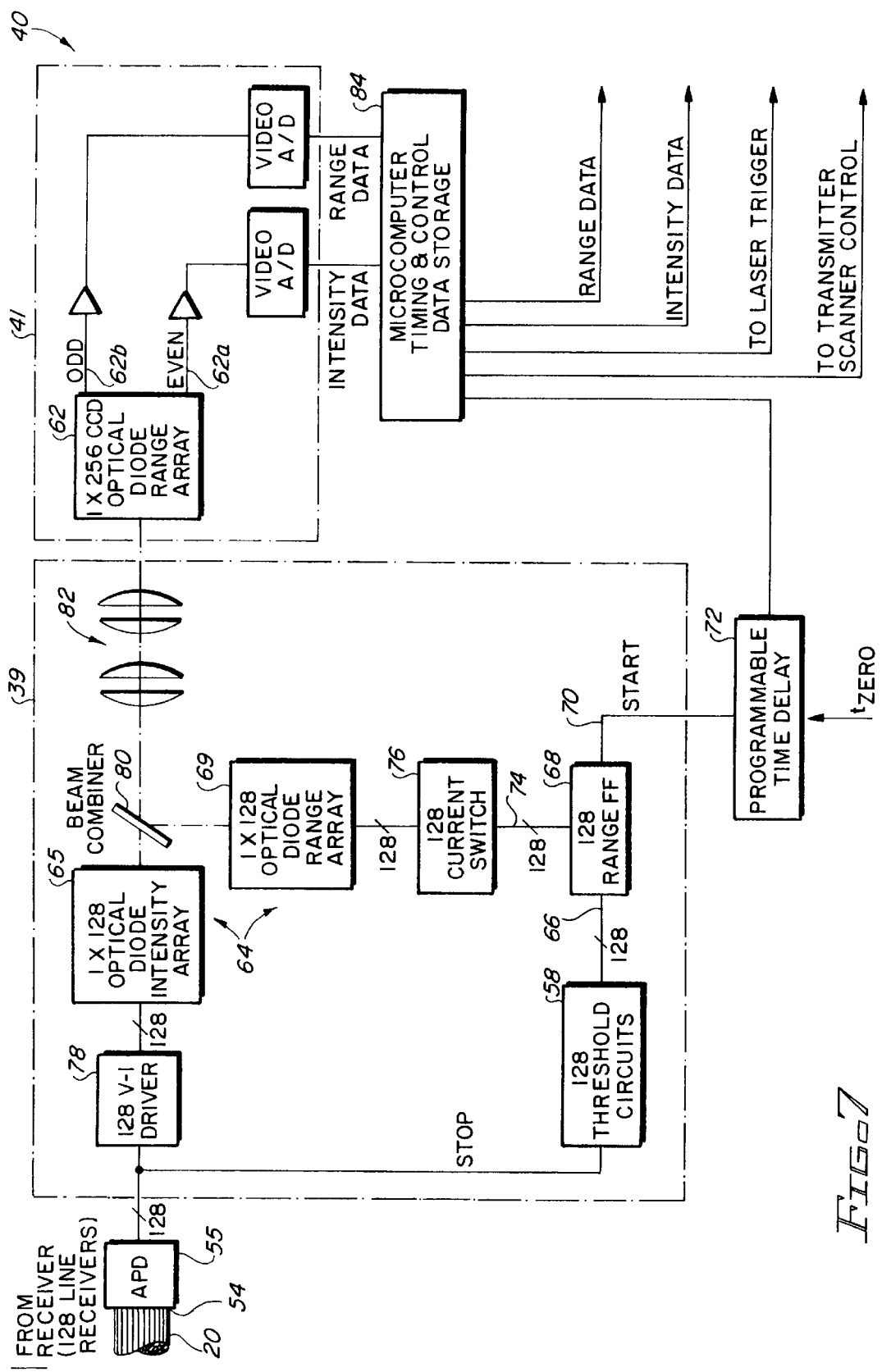
FIG. 7 is a functional block diagram of a range and intensity measurement circuit of a preferred embodiment of the present invention.

By way of example, and with reference to the receiver output 60 illustrated in FIG. 7, such outputs 60 and subsequent signals are carried through a multiplicity of cable to accommodate each of the line receivers. In the case of the described embodiment, 128 signal lines and devices are required and indicated within the schematic diagram of FIG. 7 by a slash-line and the numeral 128.

Figure 9:
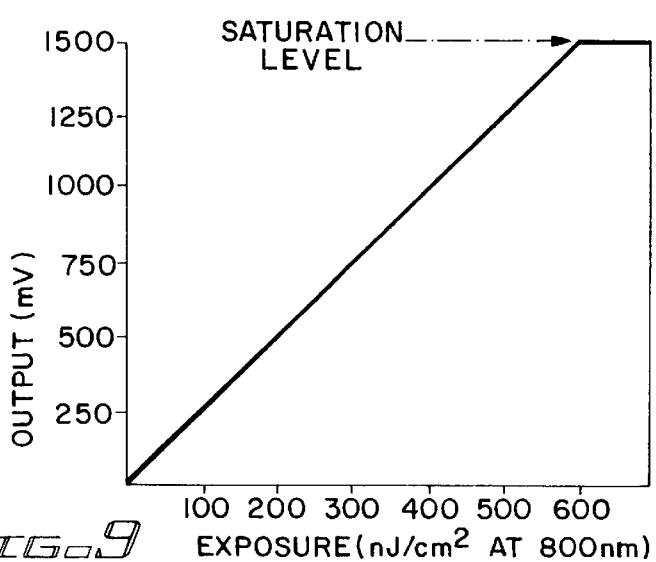
FIG. 9 illustrates a voltage-exposure characteristic response for a CCD.

The range measurement system 40 is an analog-type measurement system having some well-known elements as described in U.S. Pat. Nos. 5,321,490 to Olson, et al., 5,278,423 to Wangler, et al., and in 5,243,553 to Flockencier. Typical and well-known in the art, a capacitor is charged from the time of laser transmission to the time of reception. The from a capacitor provides a direct measurement of the time between the transmitted and received pulses if the charging of the capacitor is done using a constant current. However, although the method used in the present invention is an analog method, a charging capacitor is not used to measure time of flight. A CCD array 62, as illustrated in FIG. 7, is exposed to constant optical power for a time period that represents a round trip range propagation time, wherein the output of the CCD array 62 is proportional to its amount of exposure. FIG. 9 illustrates, by way of example, a CCD characteristic for one manufacturer's CCD where the output voltage is plotted versus the exposure. The amount of exposure is in units of energy per square centimeter. The exposure amount in energy is the optical power times the time that this power is present. Therefore, the exposure as herein described is the time integration amount of the exposure to the optical power. Therefore, with a constant power, the output voltage is a direct measurement of the time interval or period that the constant power is on a CCD element. It should be emphasized here that the CCD array 62 has nothing to do with detecting the laser power that is transmitted, but is only used for the measurement of the range and intensity of the reflected return signal.

Therefore, with regard to range measurements from the camera 10 to the scene 32, as herein described for a preferred embodiment and further illustrated with reference to FIG. 10, this invention comprises first light transmitting means 12 for transmitting the pulsed laser beam 16 across the scene 32 using scanning means 42. Reflected beams 30 are received by first light receiving means 14. Second light transmitting means 39 exposes a second light receiving means 41 to a source light 43 transmitted from this second light transmitting means 39. Because of the relationship between the amount of exposure to the source light and an electrical signal output, the amount of source light received by the second light transmitting means provides the electrical signal output indicative of the range.

The CCD array is also used to measure the intensity of the return signal. A larger return signal for reflected beam 30 will drive the optical power sources 64 harder, thus producing a larger optical power output from the intensity 65 and range 69 optical diode arrays for the duration of the receive signal. This higher optical power will produce a greater exposure of the CCD array 62. It is expected that the intensity and range optical diode arrays 65, 69 will comprise Laser Diodes or Light Emitting Diodes (LED) well-known and available as of this writing. The laser range camera 10, using the CCD array 62, thus measures both the intensity and the range of the return signal 60 from pixels or a scene in the far field.

The electrical signals 60 from the 128 line receivers go to 128 voltage-to-current converters which drive the 1×128 optical diode array 65, as illustrated with reference to FIG. 7. The optical output of the array is proportional to current rather than voltage. The purpose of the voltage to current control is to give a linear output of optical power as a function of the input voltage of the signal 60 from the 128 laser receivers.

Again with reference to FIG. 7, the 128 receiver outputs 60 also go to 128 threshold detectors 58. The threshold detector 58 will put out a pulse when a set threshold is exceeded. This will occur when the range signal is received. The threshold detectors output 66 goes to 128 range flipflops 68. The range flipflop circuit is set by the t-zero signal 70 provided by a programmable time delay 72 which can adjust t-zero. When the threshold is exceeded, the pulse will reset the range flipflop 68. The width of the range flipflop output 74 will be a direct measurement of the time period from the time of transmission to the reception of the received signal. The output 74 of the 128 range flipflops 68 goes to 128 current switches 76 that place a constant current through each of 128 diodes in a 1×128 optical diode array 69, again as illustrated with reference to FIG. 7. The output of the intensity array 65, driven by the voltage-to-current drivers 78, and the output of the range optical array 69, driven by the constant current sources 76, are beam combined 80 and imaged onto the 1×256 CCD array 62. The optics 82 between the beam combiner 80 and the CCD array 62 magnifies or reduces the spacing between the optical diodes 64, intensity 65 or range 69, so that they communicate with the spacing of the CCD array 62. In the preferred embodiment of the present invention, the range CCD element array is offset by one CCD pixel so that all the intensity data will come out the even CCD elements 62a and all the odd elements 62b of the CCD array will be the range data. In an alternate embodiment, two separate CCD arrays, each having 1×128 CCD elements, are used in place of the 1×265 element array.

The earlier cited U.S. Pat. No. 5,243,553 describes some of the disadvantages of an analog ranging system, which included timing walk. Timing walk is a function of the receive signal strength, and results in range measurement errors. The timing walk in the present invention, as herein described (the stronger the signal the quicker the threshold circuit will be exceeded), does cause a slight shift in range due to the signal strength. However, in the present invention, intensity measurements are made and are used to correct the range measurement errors using a microcomputer 84 contained in the timing and control portion of the system 40. The data is corrected prior to being displayed or read. In pulse systems, the time of arrival will have a slight variation due to the signal strength. The receive pulse has a finite band width and therefore it will have a rise time associated with that band width. The rise time of a stronger signal will cross the threshold earlier than a weak signal because of the slope of the rise time of the return signal. In other words, a weaker signal appears to be further away than it actually is. With intensity measurements, corrections are made on the range data with the knowledge of how strong a signal was received. A correction algorithm in the form of a look-up table or computation is used.

Another disadvantage of earlier analog range measuring systems is that a limited dynamic range exists. The present invention corrects for this situation by inputting a programmable time delay between the time of laser transmission and the t-zero pulse, as discussed earlier with reference to FIG. 7. This time delay ranges from the laser transmission time to a selected, fixed time delay associated with a desired range less than the maximum range. It is controlled by the computer in the timing and control section of the range camera. This essentially expands interval represented by the CCD linear voltage range such that an accurate time measurement can be made for long ranges.

The programmable time delay 72 provides an expanded time scale which permits adjustment of a minimum and maximum range (dynamic range). For example, the maximum CCD output can be made to equate to a distance to the scene or range of 300 meters if all the pixels of a scene of interest are at 200 meters. In this way, saturation of the CCD is avoided. Such an adjustment is software driven from information obtained from a previously scanned scene. Further, the programmable time delay circuitry 72 is used to reset the range circuitry to eliminate leakage charging of the CCD array 62.

A practical advantage of using the CCD array 62 in a measurement device is that state of the art circuitry has been developed for the fast video systems now in existence and computer graphics can be used. The present invention further takes advantage of multiplexing output data so that it is sequentially read out and only one A to D (analog-to-digital) converter is needed for each of the range and intensity data. This is done inside the CCD array 62 integrated circuit. Thus, another big advantage is realized in that less circuitry is needed to perform the range and intensity measurements, as is typically done in the industry.

To summarize, the only scanning needed is for the laser transmitter 12, and the laser transmitter 12 is only scanned in one axis. The receiver 14 can have a very large aperture since it is not scanned. Large apertures have large inertias which make fast scanning very difficult and power consuming because of the torque motors that are required to scan the large aperture. The laser beam 16 of the present invention is scanned by a non-mechanical means, an acoustical/optical (A/O) beam deflector 50. The A/O beam deflector 50 is capable of high speed, fast scanning rates, and is electronically controlled by a computer, with the result of high precision pointing. Further, the present invention, as described, increases the laser beam divergence in one axis beam only so that the power density at the scene is higher than for a completely floodlighted laser beam typically used in the sequential range-gated systems. This yields, in the embodiment of the present invention as described, 128 times the typical power density of the laser at the scene. Further, the range and intensity measurements of the return signal are done simultaneously by a single device, the CCD measurement device. In the present invention, the CCD is not used for any laser detection. It is used for the measurement of range and intensity. A display of the intensity measurement is similar to a normal black-and-white TV image. This image is useful and has functions beyond just the image received. The intensity is used to correct range measurements.

Further, consider the parallel pipeline of data processing for the present invention. The measurement of the received signal does not have to add to the frame time in a long range system, since after all the data for one column position has been received by the measurement CCD, that data is parallel transferred to a read-out shift register (not shown) from which it is read. After this parallel transfer, the CCD pixels are reset and are ready to make the next range or intensity measurement. Thereafter, the CCD data is transferred into the read-out shift register, the transmitted laser beam is moved to the next position, and the measurement is made for that position as earlier described. The laser beam 16 travels out from the transmitter 12 and back from the scene 32 to the receiver 14. The data from a previous cycle can be read out, go through the analog-to-digital conversion process and the storage of that digital data by the computer 84 can be accomplished while waiting for the laser signal to return. This process is very similar to the parallel pipelining which is done in today's computer integrated circuits (chips). Therefore, the present invention overcomes many of the disadvantages of the sequential range-gated full-frame systems of the prior art. It uses the more sensitive photo diode rather than just CCDs. It has less beam spread (it's only spread in one axis) which results in a stronger return signal. It makes efficient use of the laser energy, because every line receiver will have a range return for every laser beam transmission. In other words, none are gated out or wasted.

The scene 32 as viewed by the receiver 14 is similar to a matrix of 128×128 pixels as earlier described. There are 128 rows of 128 pixels in each row. Each pixel could be considered to have a row address and a column address in the present laser range camera. The receiver is continuously viewing all pixels all the time and the receiver 14 combines all scene pixel information from one row. If the laser beam, was a floodlight-styled system where the entire scene was illuminated at one time, the receive signals would have no column information about the scene. It is the beam shape of the transmitter 12 that illuminates one column (e.g. 34) at a time. Therefore, when a laser return signal is received from the summed row of pixels, the row address is known by which receive channel received it. The position of the laser at the time of transmission gives you the column address.

While the specific embodiments of the invention have been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions, methods of use and reasonable mechanical equivalents thereof obvious to those skilled in the art, are set forth in the appended claims.

What is claimed is:

1. A time measurement device comprising:
light transmitting means for transmitting light at an optical power, the light transmitting means responsive to start and stop signals for transmitting the light for a time period between the start and stop signals; and light receiving means including a charged coupled device (CCD) positioned for exposure to the light from the light transmitting means, the CCD providing a time integration amount of the exposure to the optical power for providing an output signal proportional to [an] the time integration amount of exposure to the light received during the time period between the start and stop signals, wherein the output signal th provides a measurement of the time period between the start and the stop signals.

2. The time measurement device according to claim 1, wherein the transmitting means comprises:
an electrical current source;
a light emitting diode (LED); and
a switch operable with the LED and current source for providing electrical current to the LED, the switch responsive to the start and stop signals.

3. The time measurement device according to claim 1, wherein the charged coupled device (CCD) has a linear response to the time integration amount of the exposure to the light received with the light having a constant optical power, the CCD providing the output signal in a linear relationship to the time integration amount of the exposure to the light.

4. The time measurement device according to claim 3, wherein the output signal comprises a voltage signal having the linear relationship to the time integration amount of the exposure, and thus to the time between the start and stop signals.

5. A time measurement device comprising:
light transmitting means for transmitting light at an optical power, the light transmitting means responsive to start and stop signals for transmitting the light during a time period between the start and stop signals; and light receiving means including a charged coupled device (CCD) array positioned for exposure to the light from the light transmitting means, the CCD array providing a time integration amount of the exposure to the optical power for providing an electrical output signal proportional to the time integration amount of exposure to the light received during the time period between the start and stop signals, wherein the electrical output signal thus provides a measurement of the time period between the start and the stop signals.

6. The time measurement device according to claim 5, wherein the transmitting means comprises:
an electrical current source;
a light emitting diode (LED) array; and
a switch operable with the LED array and current source for providing electrical current to the LED array, the switch responsive to the start and stop signals.

7. The time measurement device according to claim 5, wherein the charged coupled device (CCO) array has a linear response to the time integration amount of the exposure to the light received from the light transmitting means with the light having a constant optical power, the CCD array providing the electrical output signal in a linear relationship to the time integration amount of the exposure to the light.

8. The time measurement device according to claim 7, wherein the electrical output signal comprises a voltage signal having the linear relationship to the time integration amount of the exposure, and thus to the time between the start and stop signals.

9. A time measurement method comprising the steps of:

transmitting light having an optical power during a time interval;

receiving the light during the time interval for providing an amount of exposure;

providing a CCD for converting energy resulting from a time integration amount of exposure to the optical power of the light received during the time interval to an electrical signal, the CCD having a response proportional to the time integration amount of the exposure to the light received; and providing a measurement of the time interval from the electrical signal.

10. The time measuring method according to claim 9, wherein the transmitting step comprises the steps of:

providing a light emitting diode (LED); and operating the LED using a current source for providing electrical current to the LED for transmitting the light.

11. The time measuring method according to claim 9, wherein the charged coupled device (CCD) has a linear response to the time integration amount of the exposure to the light received for light having constant optical power, the CCD providing the output signal in a linear relationship to the time integration amount of the exposure to the light.

12. The time measuring method according to claim 11, wherein the output signal comprises a voltage signal having the linear relationship to the time integration amount of the exposure, and thus to the time interval.

13. A time measurement method comprising the steps of:

providing a light source having an optical power output;

providing a start signal to the light source for transmitting light at the optical power;

transmitting light at the optical for providing an amount of exposure to the light;

providing a charged coupled device (CCD) for receiving the light and for providing a time integration amount of exposure to the light, the CCD having a response proportional to the time integration amount of exposure to the light;

receiving the light by the CCD;

providing a stop signal to the light source for terminating the light transmitting step;

terminating the light transmitting; and providing an electrical output signal from the CCD related to the time integration amount of exposure to the light during the time interval for the light transmitting, the electrical output providing a measurement of the time between the start and the stop signals.

14. The time measuring method according to claim 13, wherein the transmitting step comprises the steps of:

providing a light emitting diode (LED) array; and operating the LED array using a current source for providing electrical current to the LED for transmitting the light.

15. The time measuring method according to claim 13, wherein the charged coupled device (CCD) comprises a CCD array a linear response to the time integration amount of the exposure to the light received for light having a constant optical power, the CCD array providing the output signal in a linear relationship to the time integration amount of the exposure to the light.

16. The time measuring method according to claim 15, wherein the output signal comprises a voltage signal having the linear relationship to the time integration amount of the exposure, and thus to the time interval.

17. The time measuring method according to claim 13, wherein the charged coupled device (CCD) has a linear response to the time integration amount of the exposure to the light received, the CCD providing the output signal in a linear relationship to the amount of exposure to the light.

* * * * *